Feb. 27, 1968 YI-CHUNG CHANG 3,370,466
METHOD AND APPARATUS FOR LOCATING INTERFACES BETWEEN FLUIDS
Filed Sept. 24, 1965
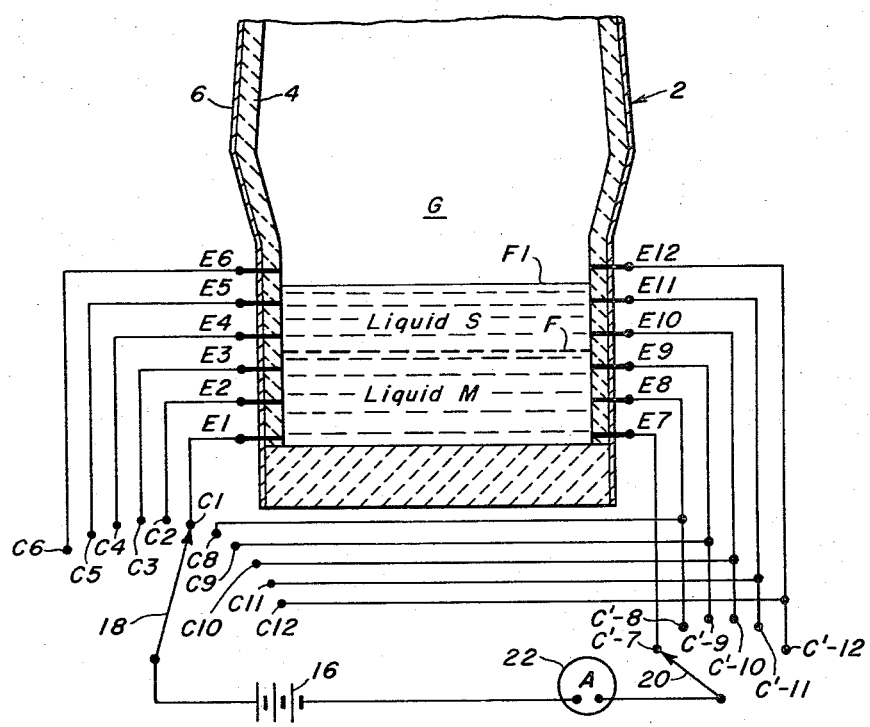
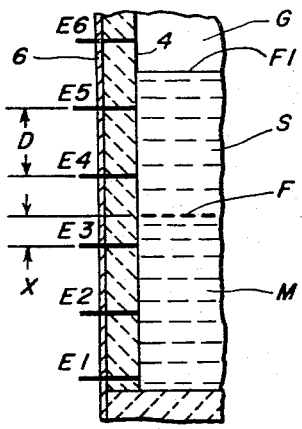
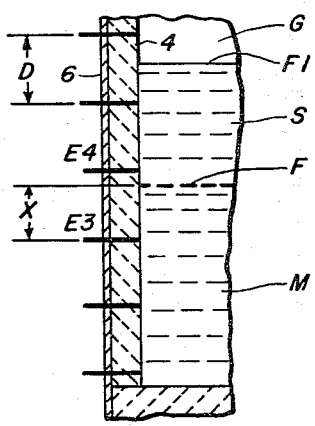
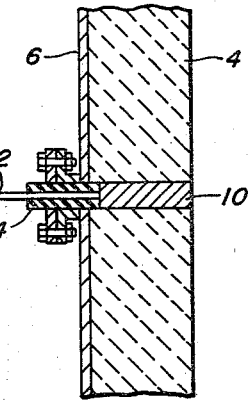
INVENTOR.
YI-CHUNG CHANG
By Donald G. Dalton
Attorney

United States Patent Office 3,370,466
Patented Feb. 27, 1968

3,370,466
METHOD AND APPARATUS FOR LOCATING
INTERFACES BETWEEN FLUIDS
Yi-Chung Chang, Franklin Township, Westmoreland County, Pa., assignor to United States Steel Corporation, a corporation of Delaware
Filed Sept. 24, 1965, Ser. No. 489,914
3 Claims. (Cl. 73—304)

ABSTRACT OF THE DISCLOSURE

A method and apparatus for determining the position of an interface between fluids such as iron and slag in a container. Two sets of vertically spaced electrodes are provided with means for determining the electrical resistance between corresponding electrodes of the two sets. Because of the difference in resistivity of the liquids the relative position of the interface can be found. By applying a formula the exact position between the nearest electrodes can be calculated.

This invention relates to a method and apparatus for locating interfaces between fluids and particularly for locating interfaces between two liquids having different electrical resistance properties and between one of the liquids and a gas. For example, the interfaces between molten pig iron and slag in a blast furance and between the slag and the gases above the slag may be determined. Many ways of locating interfaces between fluids have been used such as that disclosed in Ewertz Patent No. 2,230,137 dated Jan. 28, 1941. However, the system disclosed in that patent as well as those others of which I have knowledge can only determine the location of a liquid surface with a space above the liquid filled with a gas or an interface between two liquids and cannot determine the location of two or more interfaces. Also, the accuracy of the determination of the location of the interface is limited to the distance between two adjacent electrodes.

It is therefore an object of my invention to provide apparatus which can locate the interfaces between three or even more fluids in the container.

Another object is to provide such apparatus which can accurately determine the position of the interfaces.

Still another object is to provide a method of precisely locating the position of a plurality of interfaces between three or more fluids in a container.

These and other objects will be more apparent after referring to the following specification and attached drawings, in which:

FIGURE 1 is a schematic view of the apparatus of my invention as applied to a blast furnace;

FIGURE 2 is an enlarged view of a detail of my invention;

FIGURE 3 is an enlarged view of a portion of FIGURE 1 shown for the purpose of describing the method of my invention; and FIGURE 4 is a view, similar to FIGURE 3, for further explaining the operation of my method.

Referring more particularly to the drawings, reference numeral 2 indicates the bottom portion of a blast furnace having a refractory wall 4 and a metal shell 6. Molten iron M is collected in the bottom of the blast furance with slag S thereabove. It will be seen that there is an interface F between the molten iron and the slag S. The top of the slag provides an interface F1 between the slag and the gases G thereabove. It will be understood that other liquids or gases may be substituted for those in a blast furnace.

According to my in vention, I provide one set of electrodes, E1 to E6 on one side of the furance or container 2 and a second set E7 to E12 on the opposite side of the furnace with a distance D between adjacent electrodes in each set. As shown in FIGURE 2, each electrode may be in the form of graphite 10 located in the wall 4 and connected to a lead 12. Insulation 14 surrounds the lead 12 where it passes through the shell 6. A D.C. power source, such as a battery 16, has one side connected to a multiple contact switch 18 and the other side connected to a multiple contact switch 20. Switch 18 has contacts C1 to C12 which are connected to electrodes E1 to E12, respectively, and switch 20 has contacts C'7 and C'12 which are connected to electrodes E7 to E12, respectively. An ohmmeter 22 is provided in series with the switches 18 and 20.

The location of the interface F may be determined in various ways. Electrodes E1 and E7 may be connected in circuit with power source 16, after which electrodes E8, E9 and E10 are selectively connected in series with electrode E1. The electrical resistance of the iron M is different than that of the slag S so that there will be a sharp rise in total resistance, which will be indicated on meter 22, when electrode E1 is connected to electrode E10. Since there is a difference in the electrical resistance of the slag S and that of the gas G there will be another sharp rise in the resistance which be indicated on the meter 22 when contacts E1 and E12 are connected in series, thus indicating the location of the interface F1.

Another way of determining the location of the interface is to measure the resistance between electrodes E7 and E8, E7 and E9, E7 and E10, E7 and E11 and E7 and E12. Still another way is to measure the resistances between electrodes E7 and E8, E8 and E9, E9 and E10, E10 and E11, and E11 and E12. This, of course, can be done by moving switches 18 and 20 to the desired positions. In each of the methods described it will be apparent that the resistance through the material between electrodes at different elevations is measured. This can also be done by comparing the following resistance ratios (E1–E7/E6–E7), (E1–E8/E6–E8), (E1–E9/E6–E9), etc.

The precise location of the interface can be determined in the following manner: In the manner described above, it is determined between which two electrodes the interface is located and the total resistance between these two electrodes measured. It is also necessary to obtain the co-efficients of electrical resistance for each of the fluids. The precise location of the interface is then determined algebraically by means of the equation $$X = \frac{R - DR_2}{R_1 - R_2}$$

wherein X is the distance from the interface to the nearest electrode in the first fluid, D is the distance from the said nearest electrode to the adjacent electrode in the second fluid, R is the total resistance in distance D, $R_1$ is the coefficient of resistance of the first fluid, and $R_2$ is the coefficient of resistance of the second fluid. For example, assuming that the co-efficient of electrical resistance for the molten iron M is .2 ohm per inch, the co-efficient of electrical resistance of the slag S is 1.0 ohm per inch, that the distance D is 10 inches, and the total resistance between electrodes E3 and E4 is 3 ohms, the distance of the interface F above electrode E3 in FIGURE 3 will be $$\frac{3-10}{.2-1}$$

or 8¾ inches. Assuming that the total resistance between electrodes E3 and E4 in FIGURE 4 is 7 ohms the distance between the interface F and the electrode E3 is equal to $$\frac{7-10}{.2-1}$$

or 3¾ inches. When using this method it is preferred to solve the equation by means of a computer connected to the output of meter 22.

While several embodiments of my invention have been shown and described it will be apparent that other adaptations and modifications may be made without departing from the scope of the following claims.

I claim:

1. Apparatus for locating interfaces between at least two fluids comprising a container for said fluids, a plurality of electrodes arranged in said container at different levels at least one electrode in each fluid, said electrodes being arranged in two sets spaced apart around the periphery of the container, a D.C. power source, resistance measuring means connected in series with said power source, a multiple contact switch connected to one side of said power source and adapted to selectively connect said one side to said electrodes in one set, and a multiple contact switch connected to the other side of said power source and adapted to selectively connect said other side to the electrodes in the other set whereby the resistance of the fluids between electrodes at various levels can be measured.

2. The method of precisely locating the interfaces between the adjacent fluids in a container, said fluids having different co-efficients of electrical conductivity, which comprises providing a plurality of electrodes in said container at different elevations at known distances apart, measuring the resistance through the fluids between electrodes at different elevations, comparing the resistance measurements to determine between which electrodes the interface is located, and determining the precise location of the interface by means of the equation $$X = \frac{R - DR_2}{R_1 - R_2}$$

wherein X is the distance from the interface to the nearest electrode in the first fluid, D is the distance from the said nearest electrode to the adjacent electrode in the second fluid, R is the total resistance in distance D, $R_1$ is the co-efficient of resistance of the first fluid, and $R_2$ is the co-efficient of resistance of the second fluid.

3. The method of claim 2 in which the container is a blast furnace and the fluids are molten iron, slag, and gases above the slag and the interfaces to be located are between the molten iron and slag and also between the slag and gases.

References Cited

UNITED STATES PATENTS 1,831,898  11/1931  Wignal _____ 73—304 X

FOREIGN PATENTS 645,807  11/1950  Great Britain.

LOUIS R. PRINCE, *Primary Examiner.*

S. C. SWISHER, *Assistant Examiner.*